April 21, 1931. C. C. CHANEY 1,801,485
REDUCING GEAR
Filed March 19, 1929 2 Sheets-Sheet 1
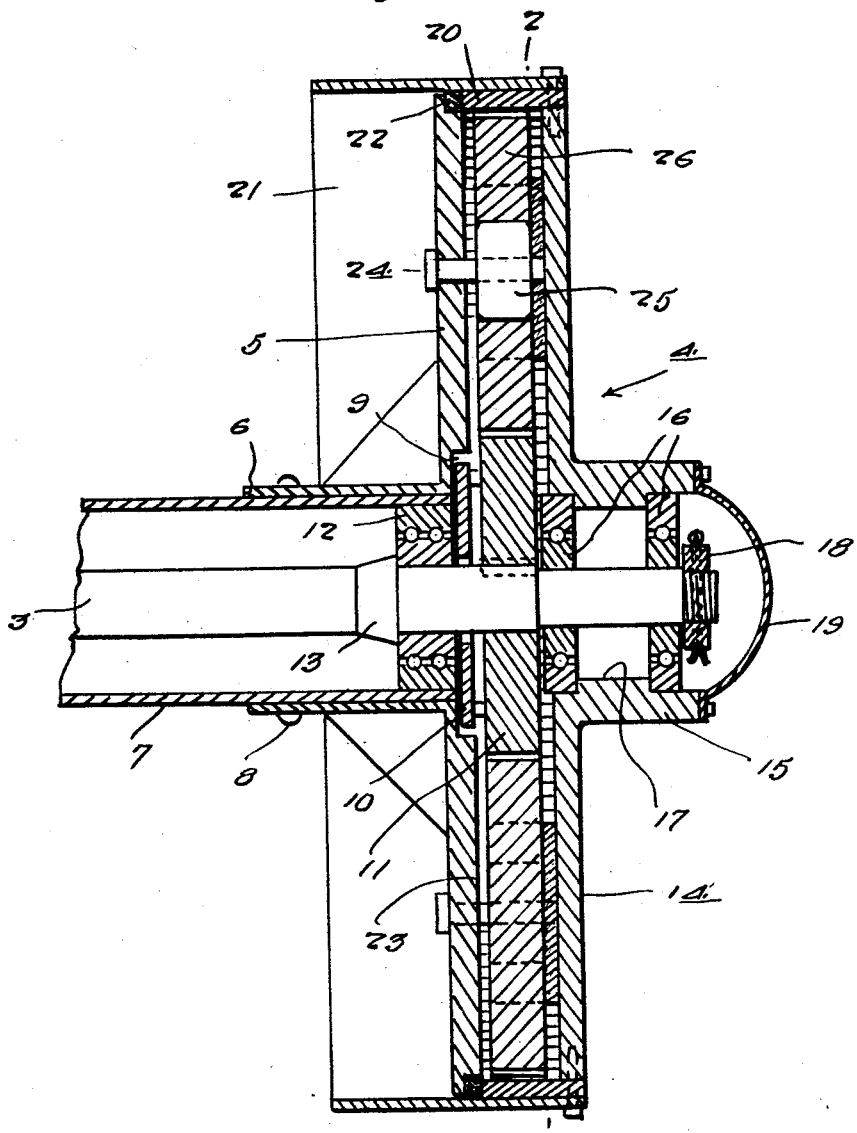
Inventor
Clyde C. Chaney April 21, 1931.                C. C. CHANEY                1,801,485
                               REDUCING GEAR
                          Filed March 19, 1929          2 Sheets-Sheet 2
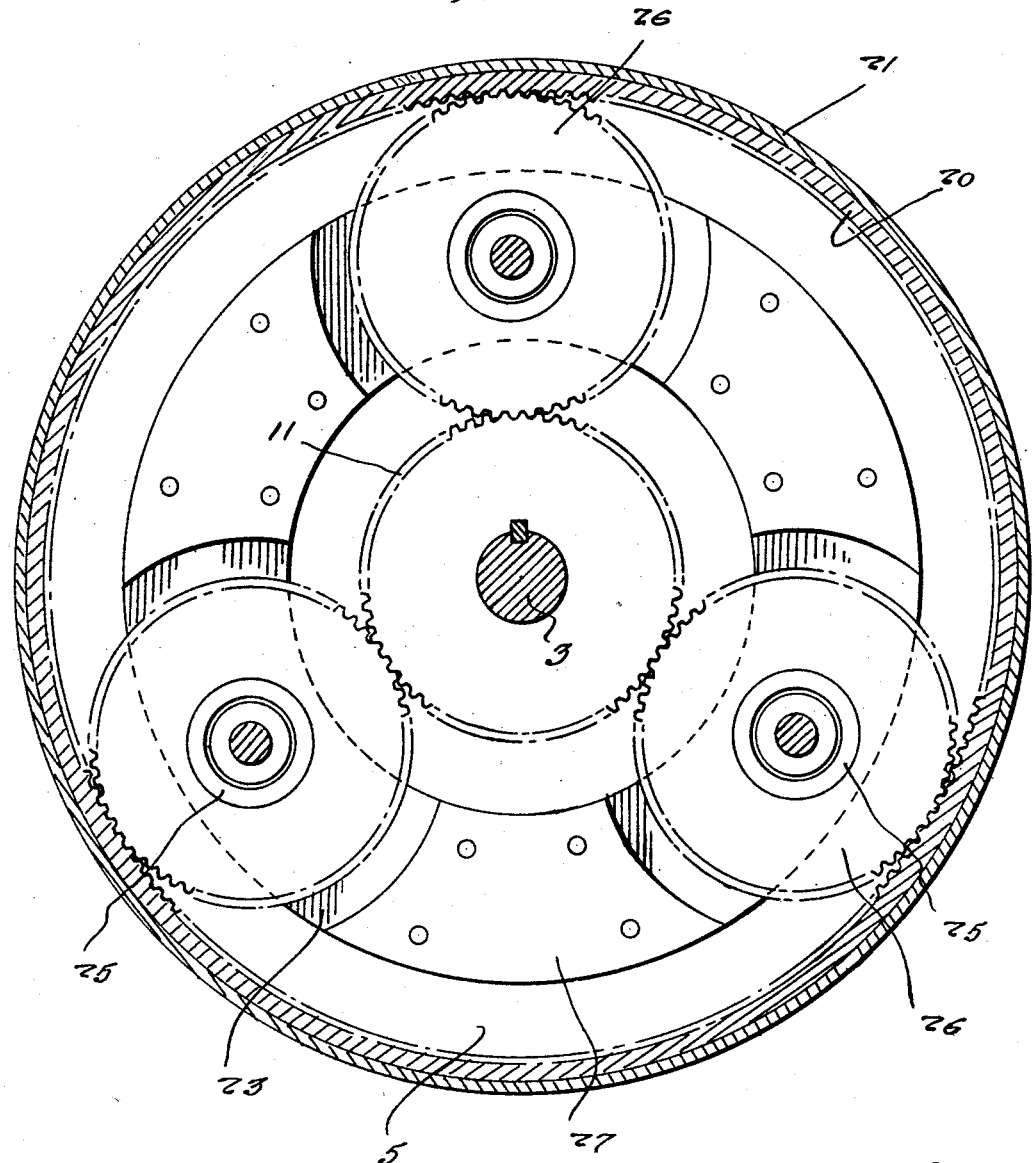
Inventor
Clyde C. Chaney
By Clarence A O'Brien
                Attorney Patented Apr. 21, 1931

1,801,485

UNITED STATES PATENT OFFICE

CLYDE CARPER CHANEY, OF RAPID CITY, MICHIGAN

REDUCING GEAR

Application filed March 19, 1929. Serial No. 348,277.

The present invention appertains to new and useful improvements in machine elements, and more particularly to a novel reducing gear especially adapted to afford additional power transmission of the drive wheels without additional strain on differential gearing or axle shafts, when the novel gearing is employed on automobiles. This gearing is especially practical on trucks, tractors, and even on pleasure cars where additional traction power is required as for instance when the machine is equipped with snow traction attachment.

The principal object of the invention is to provide a reducing gear of this character which is completely protected against inclement weather and which because of its simple construction will not be subject to the development of defects which would tend to occur in a more complicated mechanism of this nature.

These and other objects of the invention will become more apparent to the reader after considerng the invention as described and claimed hereinafter.

In the drawings:

Figure 1 represents a longitudinal sectional view through the improved gearing and axle housing.

Figure 2 represents a vertical sectional view through the improved gearing taken substantially on line 2—2 of Figure 1.

Referring to the drawings wherein like numerals designate like parts, Figure 1 is a sectional view of the reducing gear associated with one end of an axle 3, the gear structure is generally referred by the numeral 4, and includes a disk 5 having a central opening from the edge portion of which projects a sleeve 6 for telescopic relation with the end portion of the axle housing 7. The sleeve is secured to the housing by suitable rivets 8.

One side of the disk 5 is grooved at the edge portion of the central opening to rotatably receive the discular plate 10 carried spacedly by a central gear 11 keyed to the axle 3. The plate 10 serves to separate the bearing structure 12 from the gear 11, while a shoulder 13 on the axle 3 at the opposite side of the bearing structure 12 returns the bearing structure against displacement.

A disk 14 is provided with a hub structure 15 centrally located. A pair of bearing structures 16—16 are arranged within the hub and between the same and the outer end of the axle 3. The bearing structures are maintained in spaced relation to each other by means of a shoulder 17 formed circumferentially within the hub 15. The extremity of the axle extends through the outermost bearing structure and is threaded to receive a nut 18. A cover plate 19 is detachably sesured to the outer end of the hub 15.

A laterally disposed and internally toothed ring gear 20 is circumscribed by a relatively wide brake drum 21. The brake drum and the ring gear 20 are secured at one of their longitudinal edges to the periphery of the disk 14 in the manner clearly shown in Figure 1.

The periphery of the discular plate 5 is grooved to receive an insert 22 of wear resisting material against which the adjacent edge of the ring gear 20 is adapted to wipe.

An annulus 23 is concentrically arranged between the plates 5 and 14. Pins 24 are disposed through registering openings in the disk 5 and annulus 23 at circumferentially spaced intervals for supporting bearing structures 25 upon each of which a gear 26 is mounted. The gears 26 are in mesh between the central gear 11 and the ring gear 20 in the manner clearly shown in Figure 2. Blocks 27 are secured to the annulus 23 between the respective planetary gears 26.

It will thus be seen that power can be efficiently reduced at the wheels of the vehicle without subjecting the differential gearing to undue strain. Furthermore, the specific shape, size, materials may be varied in the construction of this novel mechanism without departing from the spirit and scope of the invention as claimed hereinafter.

Having thus described the invention, what I claim as new and desire to secure by Letters Patent is:—

1. A reducing gear structure for vehicle wheels comprising one end portion of an axle housing, a circular disk having a tubular extension on one side for telescoping, fixed engagement upon said end portion of the axle housing, and said disk formed with a central aperture to receive the end of the housing, and a friction packing ring mounted in an annular notch in the inner side of the peripheral edge of the disk, a plurality of equally spaced stub shafts projecting concentrically and spaced from said aperture; and an axle shaft protruding from the end of said housing, a bearing just within the end of the housing for supporting said axle, a main gear keyed on the axle, an integral spacer formed on said main gear for retaining the bearing in the end of the housing, said shaft having a shoulder for abutting the outside of said bearing, and an idler gear on each of said stub shafts in mesh with said main gear, a pair of horizontally spaced bearings on the end of the shaft, a hub on the bearings, a circular plate mounted on the inner end of the hub, an interiorly toothed ring gear in mesh with the idler gears and secured on the edge of the disk and projected to frictionally meet the friction packing ring.

2. A reducing gear structure for vehicle wheels comprising one end portion of an axle housing, a circular disk having a tubular extension on one side for telescoping, fixed engagement upon said end portion of the axle housing, and said disk formed with a central aperture to receive the end of the housing, and a friction packing ring mounted in an annular notch in the inner side of the peripheral edge of the disk, a plurality of equally spaced stub shafts projecting concentrically and spaced from said aperture and an axle shaft protruding from the end of said housing, a bearing just within the end of the housing for supporting said axle, a main gear keyed on the axle, an integral spacer formed on said main gear for retaining the bearing in the end of the housing, said shaft having a shoulder for abutting the outside of said bearing, and an idler gear on each of said stub shafts in mesh with said main gear, a pair of horizontally spaced bearings on the end of the shaft, a hub on the bearings, a circular plate mounted on the inner end of the hub, an interiorly toothed ring gear in mesh with the idler gears and secured on the edge of the disk and projected to frictionally meet the friction packing ring, and an annulus for supporting the outer ends of the stub shafts, and segmental blocks between said idler gears for spacing and mounting said annulus on the said disk, and a nut screw threaded on the outer end of the shaft and an annular shoulder in said hub for rigidly spacing said bearings.

In testimony whereof I affix my signature.

CLYDE CARPER CHANEY.